US012289607B2

(12) United States Patent
Lin

(10) Patent No.: US 12,289,607 B2
(45) Date of Patent: Apr. 29, 2025

(54) METHOD FOR SHARING CHANNEL OCCUPANCY TIME, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Hao Lin, Neuilly sur Seine (FR)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 426 days.

(21) Appl. No.: 17/703,469

(22) Filed: Mar. 24, 2022

(65) Prior Publication Data

US 2022/0217544 A1 Jul. 7, 2022

Related U.S. Application Data

(63) Continuation of application No. PCT/CN2020/120602, filed on Oct. 13, 2020.

(60) Provisional application No. 62/914,524, filed on Oct. 13, 2019.

(51) Int. Cl.
*H04W 16/14* (2009.01)
*H04W 72/0446* (2023.01)
*H04W 74/0808* (2024.01)

(52) U.S. Cl.
CPC ....... *H04W 16/14* (2013.01); *H04W 72/0446* (2013.01); *H04W 74/0808* (2013.01)

(58) Field of Classification Search
CPC ............. H04W 16/14; H04W 72/0446; H04W 74/0808
See application file for complete search history.

(56) References Cited

U.S. PATENT DOCUMENTS

| 2018/0368090 | A1 | 12/2018 | Kadambar et al. |
| 2019/0268912 | A1 | 8/2019 | Myung et al. |
| 2020/0359411 | A1* | 11/2020 | Li ........................ H04W 16/14 |
| 2022/0167407 | A1* | 5/2022 | Oviedo ............. H04W 74/0808 |

FOREIGN PATENT DOCUMENTS

| CN | 105207754 A | 12/2015 |
| WO | 2020168320 A1 | 8/2020 |
| WO | 2020190190 A1 | 9/2020 |
| WO | 2021063385 A1 | 4/2021 |

OTHER PUBLICATIONS

Extended European Search Report for EP Application 20877248.3 mailed Jul. 21, 2022. (12 pages).

(Continued)

*Primary Examiner* — Natasha W Cosme
(74) *Attorney, Agent, or Firm* — Young Basile Hanlon & MacFarlane, P.C.

(57) ABSTRACT

A method for sharing channel occupancy time (COT), a terminal device, and a network device are provided. The method includes that: a terminal device sends first indication information to a network device, the first indication information indicating whether a first COT initiated by the terminal device is allowed to be shared with the network device.

23 Claims, 4 Drawing Sheets

(56) References Cited

OTHER PUBLICATIONS

Huawei, HiSilicon, Coexistence and channel access for NR unlicensed band operations, 3GPP TSG RAN WGI Meeting #98bis, R1-1910045, Oct. 14-20, 2019. (18 pages).
Sony, Enhancements to Configured Grants in NR-U, 3GPP TSG RAN WG1 meeting #96bis, R1-1904253, Apr. 8-12, 2019. (6 pages).
Intel Corporation, Enhancements to configured grants for NR-unlicensed, 3GPP TSG RAN WG1 Meeting AH 1901, R1-1900473, Jan. 21-25, 2019. (7 pages).
3GPP TSG RAN WG1 #96bis R1-1906834; Reno, USA, May 13-17, 2019.
3GPP TSG RAN WG1 #96bis R1-1904250; Xi'an, China, Apr. 8-12, 2019.
3GPP TSG RAN WG1 Meeting #98bis R1-1910643 Chongqing, China, Oct. 14-20, 2019.
3GPP TSG RAN WG1 Meeting #94 R1-1808464 Gothenburg, Sweden, Aug. 20-24, 2018.
International search report issued in corresponding PCT/CN2020/120602 dated Dec. 31, 2020.
3GPP TSG RAN WG1 Meeting #96bis, Xian, China, R1-1905002, Qualcomm Incorporated, Enhancement to configured grants in NR unlicensed, Apr. 8-12, 2019. (10 pages).
3GPP TSG RAN WG1 Meeting #99, Reno, USA, R1-1911866, Huawei, HiSilicon, Coexistence and channel access for NR unlicensed band operations, Nov. 18-22, 2019. (18 pages).
3GPP TSG RAN WG1 NR Ad Hoc Meeting, Qingdao, China, R1-1711467, Huawei, HiSilicon, Coexistence and channel access for NR-based unlicensed band operation, Jun. 27-30, 2017. (5 pages).
Chinese First Office Action with English Translation for CN Application 202210452138.X mailed Jun. 3, 2023. (17 pages).
Chinese Second Office Action with English Translation for CN Application 202210452138.X mailed Jul. 20, 2023. (10 pages).
Communication pursuant to Article 94(3) EPC for EP Application 20877248.3 mailed Jun. 1, 2023. (5 pages).
Communication pursuant to Article 94(3) EPC for EP Application 20877248.3 mailed Feb. 8, 2023. (8 pages).

\* cited by examiner

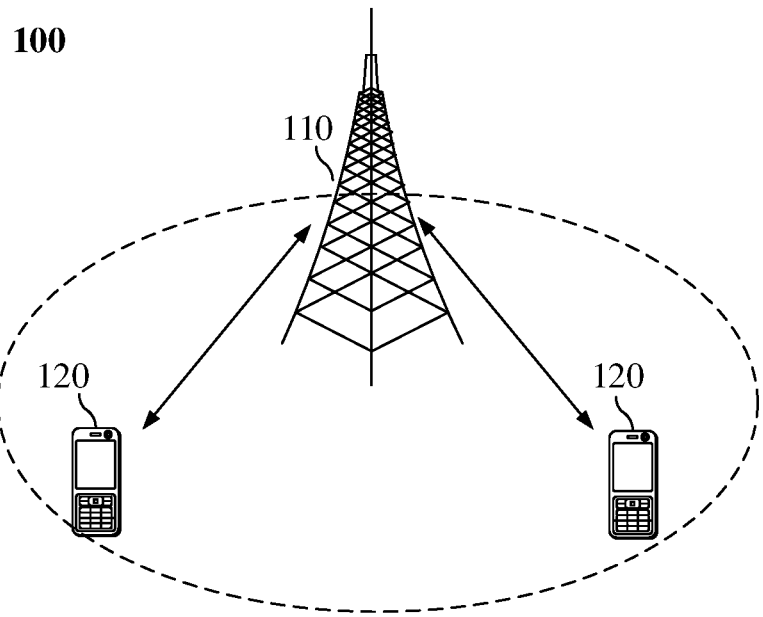
FIG. 1
A terminal device sends first indication information to a network device, and the network device receives the first indication information from the terminal device, the first indication information indicating whether a first COT initiated by the terminal device is allowed to be shared with the network device.    201
FIG. 2
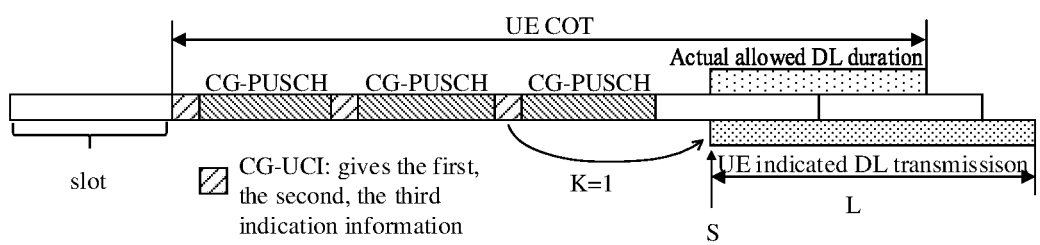
FIG. 3

METHOD FOR SHARING CHANNEL OCCUPANCY TIME, TERMINAL DEVICE, AND NETWORK DEVICE

CROSS-REFERENCE TO RELATED APPLICATION(S)

This application is a continuation of International Application No. PCT/CN2020/120602, filed on Oct. 13, 2020, which claims priority to US Provisional Application No. 62/914,524, filed on Oct. 13, 2019, the entire contents of both of which are incorporated herein by reference.

TECHNICAL FIELD

The embodiments of the present disclosure relate to a technical field of the mobile communications, and particularly, to a method for sharing channel occupancy time (COT), a terminal device, and a network device.

BACKGROUND

In an unlicensed band, an uplink COT initiated by a terminal device (i.e., user equipment (UE)) can be shared with a network device (i.e., a base station (BS)) for downlink transmission.

When the terminal device wants to share its COT with the network device, how does the terminal device signal to the network device about necessary information so that the network device can perform a downlink transmission in the COT of the terminal device (i.e., UE COT) is still an open problem.

SUMMARY

The embodiments of the present disclosure provide a method for sharing channel occupancy time (COT), a terminal device, and a network device.

The embodiments of the present disclosure provide a method for sharing channel occupancy time (COT), which includes that: a terminal device sends first indication information to a network device, the first indication information indicating whether a first COT initiated by the terminal device is allowed to be shared with the network device.

The embodiments of the present disclosure provide a method for sharing channel occupancy time (COT), which includes that: a network device receives first indication information from a terminal device, the first indication information indicating whether a first COT initiated by the terminal device is allowed to be shared with the network device.

The embodiments of the present disclosure provide a terminal device, including: a transceiver, a processor, and a memory for storing a computer program, the processor being configured to call and run the computer program stored in the memory to cause the transceiver to send first indication information to a network device, wherein the first indication information indicates whether a first COT initiated by the terminal device is allowed to be shared with the network device.

The embodiments of the present disclosure provide a network device, including: a transceiver, a processor, and a memory for storing a computer program, the processor being configured to call and run the computer program stored in the memory to cause the transceiver to receive first indication information from a terminal device, wherein the first indication information indicates whether a first COT initiated by the terminal device is allowed to be shared with the network device.

BRIEF DESCRIPTION OF DRAWINGS

The drawings described herein are used to provide a further understanding of the application and form a part of the application. The schematic embodiments of the application and the description thereof are used to explain the application and do not constitute an improper limitation of the application. In the drawings:

FIG. 1 is a schematic diagram of architecture of a communication system according to at least some embodiments of the present disclosure;

FIG. 2 is a flowchart of a method for sharing channel occupancy time (COT) according to at least some embodiments of the present disclosure;

FIG. 3 is a schematic diagram of a time-domain structure of a first example according to at least some embodiments of the present disclosure;

DETAILED DESCRIPTION

Figure 4:
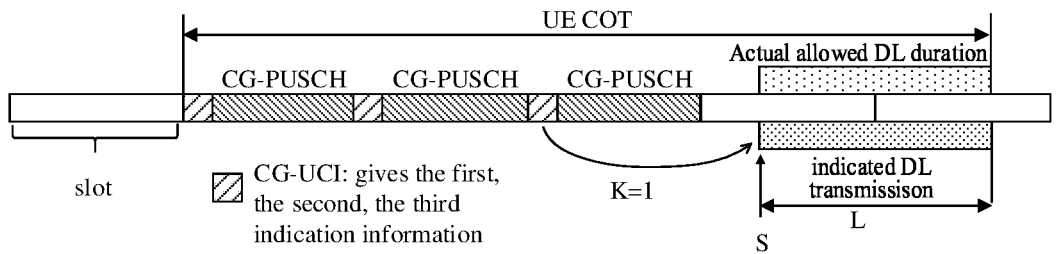
FIG. 4 is a schematic diagram of a time-domain structure of a second example according to at least some embodiments of the present disclosure.

The technical solution in the embodiments of the application will be described below in conjunction with the drawings in the embodiments of the application. It is apparent that the described embodiments are a part of the embodiments of the application, not all of the embodiments. Based on the embodiments in the application, all other embodiments obtained by those skilled in the art without creative effort belong to the protection scope of the application.

The technical solutions of the embodiments of the present disclosure may be applied to various communication systems, such as long term evolution (LTE) system, LTE frequency division duplex (FDD) system, LTE time division duplex (TDD) system, 5th generation (5G) communication system or future communication system, etc.

Exemplarily, the communication system 100 to which the embodiments of the present disclosure is applied is illustrated in FIG. 1. The communication system 100 may include a network device 110, which may be a device communicating with a terminal 120 (also referred to as a communication terminal, terminal). The network device 110 may provide communication coverage for a specific geographic area and may communicate with a terminal located within the coverage area. Alternatively, the network device 110 can be an Evolutional base station (Evolutional Node B, eNB or eNodeB) or a wireless controller in network in a cloud radio access network (CRAN) in an LTE system, or the network device can be mobile switching center, relay station, access point, on-board equipment, wearable equipment, hub, switch, bridge, router, network-side device in 5G network or network device in a future communication system, etc.

The communication system 100 also includes at least one terminal 120 located within the coverage of the network device 110. The "terminal" used herein includes but is not limited to the connection via wired lines, such as public switched telephone networks (PSTN) and digital subscriber lines Line, DSL, digital cable, direct cable connection; and/or another data connection/network; and/or via wireless interface, such as for cellular network, wireless local area network (WLAN), such as DVB-H Digital television network, satellite network, AM-FM broadcast transmitter of the network; and/or device set to receive/send communication signals of another terminal; and/or Internet of things (IOT) device. A terminal set to communicate via a wireless interface may be referred to as a "wireless communication terminal", "wireless terminal" or "mobile terminal". Examples of mobile terminals include, but are not limited to, satellites or cellular phones; personal communications systems that can combine cellular radiotelephony with data processing, fax, and data communication capabilities System (PCS) terminals; PDAs that may include radiophones, pagers, Internet/intranet access, web browsers, notebooks, calendars, and/or global positioning system (GPS) receivers; and conventional laptop and/or handheld receivers or other electronic devices including radiophone transceivers. Terminal can refer to access terminal, terminal device, user unit, user station, mobile station, mobile station, remote station, remote terminal, mobile device, user terminal, terminal, wireless communication device, user agent or user device. Access terminals can be cellular telephone, cordless telephone, session initiation protocol (SIP) telephone, wireless local loop (WLL) station, personal digital processing (PDP) Assistant, PDA), handheld device with wireless communication function, computing device or other processing device connected to wireless modem, on-board device, wearable device, terminal in 5g network or terminal in PLMN evolving in the future.

Optionally, the terminals 120 may perform communications on Device-to-Device (D2D) direct connection.

Optionally, a 5G communication system or 5G network may also be referred to as New Radio (NR) system or NR system.

FIG. 1 illustrates an example of a network device and two terminals. Alternatively, the communication system 100 may include a plurality of network devices and there may be other numbers of terminals within the coverage of each network device, which is not limited by the embodiments of the present disclosure.

Alternatively, the communication system 100 may also include other network entities such as a network controller, a mobile management entity, etc., which are not limited by the embodiments of the present disclosure.

It is to be understood that devices having communication functions in the network/system according to the embodiments of the present disclosure may be referred to as communication devices. Taking the communication system 100 illustrated in FIG. 1 as an example, the communication device may include the network device 110 and the terminal 120 with the communication function. The network device 110 and the terminal 120 may be the specific devices as described above, which will not be described here in detail. The communication device may also include other devices in the communication system 100, such as the network controller, the mobile management entity and other network entities, which are not limited in the embodiment of the present disclosure.

It is to be understood that the terms "system" and "network" herein are often used interchangeably. Herein, the term "and/or" is just a kind of association relation describing the associated object, which means that there can be three kinds of relations, for example, A and/or B, which means that there is A alone, A and B at the same time, and B alone. In addition, the character "/" in this paper generally indicates that the relation between the front and back related objects is a kind of "or".

To facilitate the understanding of the technical solution of the embodiments of the disclosure, the technical solution related to the embodiments of the disclosure will be described below.

Unlicensed Band

The unlicensed spectrum is a shared spectrum. The communication equipment in different communication systems can use the spectrum as long as it meets the regulatory requirements set by the country or region on the spectrum, and does not need to apply for a proprietary spectrum authorization from the government.

In order to allow various communication systems that use unlicensed spectrum for wireless communication to coexist friendly in the spectrum, some countries or regions specify regulatory requirements that must be met to use unlicensed spectrum. For example, the communication device follows the principle of "Listen Before Talk (LBT)", that is, the device needs to perform channel sensing before transmitting the signal on the channel. Only when the LBT outcome shows that the channel is idle, the device can perform signal transmission; otherwise, the device cannot perform signal transmission. In order to ensure fairness, once a devices successfully occupies the channel, the transmission duration cannot exceed the Maximum Channel Occupancy Time (MCOT).

Uplink COT Sharing

In the unlicensed band, the uplink COT initiated by the terminal device (i.e., a UE) can be shared with the network device (i.e., BS) for downlink transmission. The BS can perform quick LBT, i.e. LBT Category 1 (immediate transmission without LBT) if the base station creates a 16 us gap; or Category 2 (one shot LBT) if the base station creates a 16 or 25 us gaps in the shared UE COT.

When the UE wants to share its COT with the BS, how does the UE signal to the BS about the necessary information so that the BS can perform the downlink transmission in the UE COT is still an open problem. This invention discloses a method that solves this problem.

It should be noted that the technical solutions according to the embodiments of the present disclosure can be applied to unlicensed band communications, such as 5G NR unlicensed band communications.

It should be noted that the terminal device in the following embodiments of the present disclosure may be, but is not limited to a UE, and the network device in the following embodiments of the present disclosure may be, but is not limited to a base station (such as a gNB).

FIG. 2 is a flowchart of a method for sharing channel occupancy time (COT) according to at least some embodiments of the present disclosure. As illustrated in FIG. 2, the method for sharing the COT includes the following operations.

At 201, a terminal device sends first indication information to a network device, and the network device receives the first indication information from the terminal device. The first indication information indicates whether a first COT initiated by the terminal device is allowed to be shared with the network device.

In the embodiments of the disclosure, the first COT is initiated by the terminal device, and the terminal device can perform uplink transmission in the first COT. Here, the first COT may be referred to as a COT at the terminal device side, for example, the first COT is referred to as a UE COT.

In the embodiments of the present disclosure, the terminal device can share its COT (i.e., the first COT) with the network device, so that the network device can perform a downlink transmission in the first COT. The following describes how the terminal device shares its COT with the network device.

In the embodiments of the present disclosure, the terminal device sends the first indication information to the network device, and the network device receives the first indication information from the terminal device. The first indication information indicates whether the first COT initiated by the terminal device is allowed to be shared with the network device.

In an optional implementation, the first indication information may include 1-bit indication information. When a value of the 1-bit indication information is a first value, the first indication information indicates that the first COT is allowed to be shared with the network device. Or, when the value of the 1-bit indication information is a second value, the first indication information indicates that the first COT is not allowed to be shared with the network device.

For example, the first value is 0 and the second value is 1, when the value of the 1-bit indication information is 0, which means that the first COT is allowed to be shared with the network device; when the value of the 1-bit indication information is 1, which means that the first COT is not allowed to be shared with the network device.

Alternatively, the first value is 1 and the second value is 0, when the value of the 1-bit indication information is 1, which means that the first COT is allowed to be shared with the network device; when the value of the 1-bit indication information is 0, which means that the first COT is not allowed to be shared with the network device.

It is to be noted that the aforementioned "1-bit indication information" may also be referred to as "1-bit on/off indication information".

In the embodiments of the present disclosure, when the first indication information indicates that the first COT is allowed to be shared with the network device, the first COT is used for the network device to perform a downlink transmission; or, when the first indication information indicates that the first COT is not allowed to be shared with the network device, when the first condition is verified, the first COT is used for the network device to perform a downlink transmission, the first condition being that an ending time of the uplink transmission of the terminal device is before an ending time of the first COT.

The ending time of the uplink transmission of the terminal device may be represented by $T\_ul\_e$.

It is to be noted that the network device uses a portion of the first COT for downlink transmission. Here, a starting time of the portion of the first COT is after or at the ending time of the uplink transmission of the terminal device, and an ending time of the portion of the first COT is before or at the ending time of the first COT.

In an optional implementation, the first indication information indicates that the first COT is allowed to be shared with the network device, and the first COT is used for the network device to perform a downlink transmission, the terminal device further sends second indication information to the network device, and the network device receives the second indication information from the terminal device, the second indication information indicating time domain resources in the first COT for the downlink transmission.

Specifically, the second indication information indicates at least one of the following: a starting time of the time domain resources; an ending time of the time domain resources; or duration of the time domain resources.

Here, the starting time of the time domain resources may be represented by $T\_dl\_s$, the ending time of the time domain resources may be represented by $T\_dl\_e$, and the duration of the time domain resources may be represented by $dur\_dl$.

In an optional implementation, the second indication information may include at least one of the following:

1) Slot indication information, indicating a number of slots between a first slot and a second slot, the first slot being a starting slot of the time domain resources, and the second slot is a slot where the terminal device sends the second indication information (i.e., a slot where the network device detects the second indication information).

Here, the first slot (i.e., the slot in which the downlink transmission starts) may be represented by $slot\_dl\_s$.

Optionally, the number of slots indicated through the slot indication information is one among multiple candidate slot numbers, which are pre-stored or configured through radio resource control (RRC).

For example, the multiple candidate slot numbers are {n1, n2, n3, n4}, a candidate slot number n2 is selected from the 4 candidate slot numbers, and the candidate slot number n2 is indicated through the slot indication information.

2) Starting symbol indication information, indicating a starting symbol of the time domain resources.

In other words, the staring symbol indication information indicates from which symbol of the starting slot the downlink transmission can start.

Here, the starting symbol of the time domain resources may be represented by $sym\_dl\_s$.

Optionally, the starting symbol indication information may include N-bit bitmap indication information, where N is a positive integer, and each bit in the bitmap indication information corresponds to a symbol position.

The starting symbol indication information can be N-bit bitmap indication information with each bit representing a pre-defined symbol position within a slot. For example, N is 14, one slot includes 14 symbols, and the 14 bits in the bitmap correspond to the 14 symbol positions in the slot one-to-one. A value of each bit indicates whether the symbol position corresponding to the bit is used for downlink transmission.

It is to be noted that the network device can determine the first slot (i.e., the starting slot of the time domain resources for downlink transmission) based on the slot indication information and the second slot (i.e., the slot where the terminal device sends the second indication information or the slot wherein the network device detects the second indication information), and the network device can determine the starting symbol of the time domain resources for downlink transmission based on the starting symbol indication information, thereby determining the starting time of downlink transmission. Here, the starting time of the time domain resources for downlink transmission can be characterized by the starting slot and starting symbol of downlink transmission.

3) Duration indication information, indicating a number of symbols or slots occupied by the time domain resources.

In other words, the duration indication information indicates duration from the starting symbol of the time domain resources up to the ending symbol of the time domain resources.

Here, the duration from the starting symbol up to the ending symbol of the time domain resources (referred to as the duration in which the downlink transmission can be performed) can be represented by dur_dl.

Optionally, the number of symbols or slots indicated through the duration indication information is one among multiple candidate symbol numbers or slot numbers, which are pre-stored or RRC configured.

For example, the multiple candidate symbol numbers are {m1, m2, m3, m4}, a candidate symbol number m2 is selected from the 4 candidate symbol numbers, and the candidate symbol number m2 is indicated through the duration indication information.

It is to be noted that the duration indicated through the duration indication information is in units of symbols, and is not limited to this, and the duration indicated through the duration indication information may also be in units of slots. For example, the duration indication can be the selection among multiple candidate durations (in symbols or slots), whose values are pre-stored or RRC configured.

In an optional implementation, the terminal device sends third indication information to the network device, and the network device receives the third indication information from the terminal device, the third indication information being used for determining the first COT.

Specifically, the third indication information indicates at least one of the following: a starting time of the first COT, the ending time of the first COT, or duration of the first COT.

Here, the ending time of the first COT may be represented by T_cot_e.

In an optional implementation, the third indication information may include at least one of absolute duration indication information or symbolic duration indication information. The absolute duration indication information indicates absolute time duration from a first reference time up to the ending time of the first COT. The symbolic duration indication information indicates a number of symbols between the first reference time and the ending time of the first COT.

In one example, the third indication information can contain absolute time duration (in second) from a first reference time up to T_cot_e.

In another example, the third indication information can contain a symbolic time duration from a first reference time up to T_cot_e.

In the embodiments of the present disclosure, the first reference time may be determined based on the time when the terminal device sends the third indication information. Specifically, the first reference time is relevant to the channel position in which UE sends the third indication information.

In an optional implementation, the first reference time may be a starting or an ending of a slot in which UE sends the third indication information.

In an optional implementation, the first reference time may be a starting symbol or an ending symbol of a channel in which UE sends the third indication information.

In an optional implementation, at least one of the first indication information, the second indication information, or the third indication information may be indicated through configured grant-uplink control information (CG-UCI).

In the embodiments of the present disclosure, for the network device, after receiving the one or more indication information, the network device determines allowed downlink (DL) transmission time resources includes that:

I) In a case where the first indication information indicates that the first COT is allowed to be shared with the network device, when the starting time of downlink transmission is before the ending time of the first COT and when the ending time of downlink transmission is before or at the ending time of the first COT, the network device determines that the actual allowed time domain resources for downlink transmission are the same as the time domain resources indicated through the second indication information.

For example, if BS is allowed to share UE COT, and if T_dl_s<T_cot_e and T_dl_e<T_cot_e, the BS determines the actual allowed DL transmission time resources are the same as the indicated time resources by the second indication.

II) In a case where the first indication information indicates that the first COT is allowed to be shared with the network device, when the starting time of downlink transmission is before the ending time of the first COT and when the ending time of downlink transmission is after the ending time of the first COT, the network device determines that the actual allowed time domain resources for downlink transmission end before the ending time of the first COT.

For example, if BS is allowed to share UE COT, and if T_dl_s<T_cot_e and T_dl_e>T_cot_e, the BS determines the actual allowed DL transmission time resources should end before T_cot_e.

III) In a case where the first indication information indicates that the first COT is not allowed to be shared with the network device, when the ending time of uplink transmission of the terminal device is before the ending time of the first COT, the network device determines that the network device may share a portion of the first COT, the starting time of the portion of the first COT is after or at the ending time of the uplink transmission, and the ending time of the portion of the first COT is before or at the ending time of the first COT.

For example, if BS is not allowed to share UE COT, the BS can share the UE COT only when a first condition is verified. Here, the first condition is that the UE uplink transmission ends (T_ul_e) before T_cot_e. Then the BS can share the UE COT starting after T_ul_e up to T_cot_e.

In the above solution, the ending time of the uplink transmission is indicated by the terminal device through fourth indication information; or, the ending time of the uplink transmission is determined by the network device according to scheduling information of the uplink transmission (that is, the ending time of the uplink transmission is a scheduling ending position known by the network device); or, the ending time of the uplink transmission is determined by the network device according to configuration information of the uplink transmission (that is, the ending time of the uplink transmission is a configuration ending position known by the network device).

In the embodiments of the present disclosure, there is an association between the ending time of the uplink transmission of the terminal device and the starting time of the time domain resources for the downlink transmission of the network device, and the association is predefined or configured through RRC. Specifically, T_ul_e and T_dl_s can have dependent relationship such that one can be derived from the other. And thus, only one of the two needs to be indicated.

In an optional implementation, at least one of the first indication information, the second indication information, the third indication information, or the fourth indication information may be indicated through configured grant-uplink control information (CG-UCI).

The technical solutions of the embodiments of the present disclosure will be illustrated as follows in conjunction with specific application examples.

First Example

In this example, UE sends the first, the second and the third indications to BS, and the BS obtains the three indications and then determines the DL transmission resources.

During practical implementation, UE starts a COT by transmitting configured grant physical uplink shared channel (CG-PUSCH) at the same time, UE sends CG-uplink control information (CG-UCI) to indicate the first, the second and the third indications. Once the BS obtains these three indications, the BS knows if the COT is allowed to be shared or not. Moreover, the BS can obtain the UE COT ending time and the DL transmission starting time and the duration. As illustrated in FIG. 3, it is assumed that the indicated DL transmission is not fully inside the UE COT. Then the BS will determine that the actual allowed DL duration should end before the UE COT.

Second Example

In this example, UE sends the first, the second and the third indications, and BS obtains the three indications and then determines the DL transmission resources.

During practical implementation, UE starts a COT by transmitting configured grant physical uplink shared channel PUSCH (CG-PUSCH) at the same time, UE sends CG-uplink control information (CG-UCI) to indicate the first, the second and the third indications. Once the BS obtains these three indications, the BS knows if the COT is allowed to be shared or not. Moreover, the BS can obtain the UE COT ending time and the DL transmission starting time and the duration. As illustrated in FIG. 4, it is assumed that the indicated DL transmission is fully inside the UE COT. Then the BS will determine that the actual allowed DL duration is the same as the indicated DL transmission resources.

Third Example

In this example, UE indicates the third indication about the COT information, where T_cot_e is indicated by the number of slots.

Figure 5:
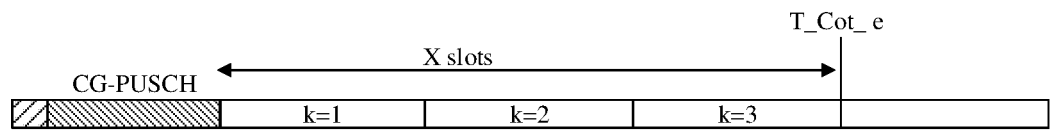
FIG. 5 is a schematic diagram of a time-domain structure of a third example according to at least some embodiments of the present disclosure.

During practical implementation, for the third indication, i.e. the UE COT ending position is indicated by the number of slots starting from the slot where UE sends the CG-UCI. For example, as illustrated in FIG. 5, the UE can indicate K=3, and it means that the UE COT will end in K=3 slots from the slot where UE sends the third indication via CG-UCI. Moreover, T_cot_e is at the end of the slot.

Fourth Example

In this example, UE indicates the third indication about the COT information, where T_cot_e is indicated by the number of symbols.

Figure 6:
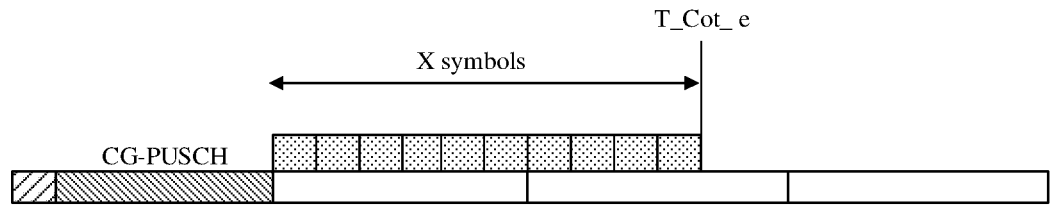
FIG. 6 is a schematic diagram of a time-domain structure of a fourth example according to at least some embodiments of the present disclosure.

During practical implementation, the UE COT ending position is indicated by the number of symbols starting from the beginning of the next slot after the slot where UE sends the CG-UCI. For example, as illustrated in FIG. 6, the UE can indicate X symbols, and it means that the UE COT will end at the X-th symbol starting from the 1st symbol of the next slot to the slot where UE sends the third indication via CG-UCI.

Fifth Example

In this example, UE indicates the second indication about the DL transmission resources, where T_dl_s and T_dl_e are derived by slot indication K, starting symbol S and duration L.

Figure 7:
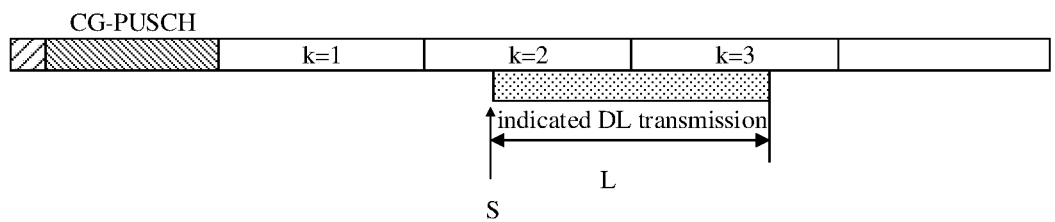
FIG. 7 is a schematic diagram of a time-domain structure of a fifth example according to at least some embodiments of the present disclosure.

During practical implementation, as illustrated in FIG. 7, the second indication contains the slot indication K, the starting symbol indication S and the DL duration L. If the UE indicates K=2, it means that the DL transmission starts in 2 slots from the current slot where UE sends the second indication via CG-UCI. Then S indicates the T_dl_s within the indicated slot. Moreover the duration L can be the number of symbols or the number of slots or combination of both. Thus, the DL transmission resources T_dl_s and T_dl_e can be derived from K, S and L.

Sixth Example

In this example, UE indicates the second indication about the DL transmission resources, where T_dl_s and T_dl_e are derived by X symbol and duration L.

Figure 8:
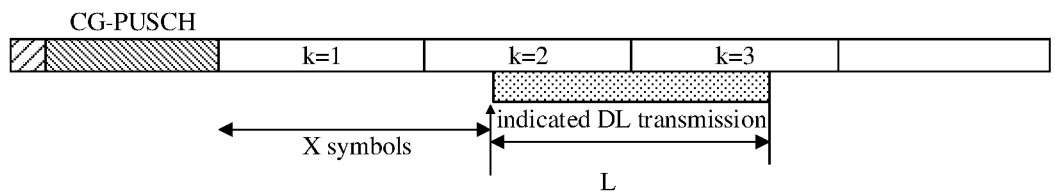
FIG. 8 is a schematic diagram of a time-domain structure of a sixth example according to at least some embodiments of the present disclosure.

During practical implementation, as illustrated in FIG. 8, the starting symbol is indicated by X symbols from the starting symbol of the next slot to the slot where UE sends the second indication. Similar to the fifth example, L represents the DL transmission duration. Thus, the DL transmission resources T_dl_s and T_dl_e can be derived from X and L.

Seventh Example

In this example, UE indicates that UE COT cannot be shared, but in this case BS can still share the remaining UE COT.

Figure 9:
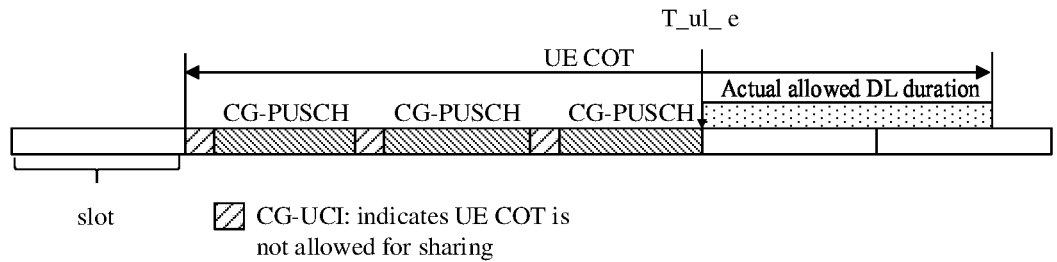
FIG. 9 is a schematic diagram of a time-domain structure of a seventh example according to at least some embodiments of the present disclosure.

During practical implementation, as illustrated in FIG. 9, even UE indicates with the first indication that the UE COT cannot be shared, but if the BS finds that the UE COT contains some resources that are not reserved for the UE uplink transmission, e.g. the UE uplink transmission ending position T_ul_e ends before the end of the UE COT. The BS can still share the remaining UE COT for downlink transmission. In this case the BS won't take consideration of the first and the second indications.

Figure 10:
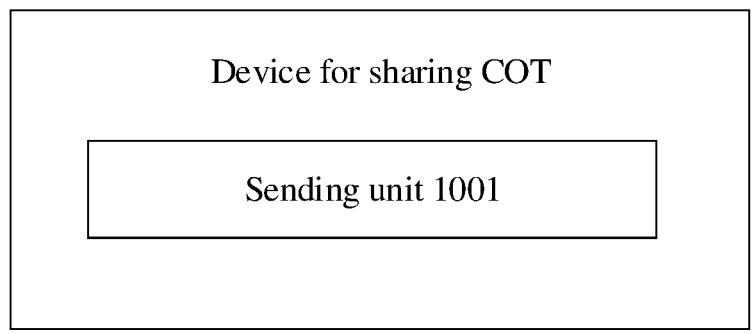
FIG. 10 is a first schematic diagram of a structure of a device for sharing COT according to at least some embodiments of the present disclosure.

FIG. 10 is a first schematic diagram of a structure of a device for sharing COT according to at least some embodiments of the present disclosure. Here, the device for sharing COT is applied to a terminal device. As illustrated in FIG. 10, the device for sharing COT includes a sending unit 1001.

The sending unit is configured to send first indication information to a network device, the first indication information indicating whether a first COT initiated by the terminal device is allowed to be shared with the network device.

In an optional implementation, the first indication information may include 1-bit indication information. When a value of the 1-bit indication information is a first value, the first indication information indicates that the first COT is allowed to be shared with the network device; or, when the value of the 1-bit indication information is a second value, the first indication information indicates that the first COT is not allowed to be shared with the network device.

In an optional implementation, one of the following may apply:

when the first indication information indicates that the first COT is allowed to be shared with the network device, the first COT is used for the network device to perform a downlink transmission; or when the first indication information indicates that the first COT is not allowed to be shared with the network device, when a first condition is verified, the first COT is used for the network device to perform the downlink transmission, the first condition being that an ending time of uplink transmission of the terminal device is before an ending time of the first COT.

In an optional implementation, the first indication information indicates that the first COT is allowed to be shared with the network device, and the first COT is used for the network device to perform a downlink transmission, the sending unit 1001 may be further configured to send second indication information to the network device, the second indication information indicating time domain resources in the first COT for the downlink transmission.

In an optional implementation, the second indication information may indicate at least one of the following: a starting time of the time domain resources; an ending time of the time domain resources; or duration of the time domain resources.

In an optional implementation, the second indication information may include at least one of the following: slot indication information, starting symbol indication information, or duration indication information.

The slot indication information indicates a number of slots between a first slot and a second slot, the first slot being a starting slot of the time domain resources and the second slot being a slot where the terminal device sends the second indication information.

The starting symbol indication information indicates a starting symbol of the time domain resources.

The duration indication information indicates a number of symbols or slots occupied by the time domain resources.

In an optional implementation, the number of slots indicated through the slot indication information may be one among a plurality of candidate slot numbers pre-stored or configured through radio resource control (RRC).

In an optional implementation, the starting symbol indication information may include N-bit bitmap indication information with each bit corresponding to a symbol position, N being a positive integer.

In an optional implementation, the number of symbols or slots indicated through the duration indication information may be one among a plurality of candidate symbol numbers or slot numbers pre-stored or configured through RRC.

In an optional implementation, the sending unit 1001 may be further configured to send third indication information to the network device, the third indication information being used for determining the first COT.

In an optional implementation, the third indication information may indicate at least one of the following: a starting time of the first COT; an ending time of the first COT; or duration of the first COT.

In an optional implementation, the third indication information may include at least one of the following: absolute duration indication information or symbolic duration indication information.

The absolute duration indication information indicates absolute time duration from a first reference time up to the ending time of the first COT.

The symbolic duration indication information indicates a number of symbols between the first reference time and the ending time of the first COT.

In an optional implementation, the first reference time may be determined based on a time when the terminal device sends the third indication information.

In an optional implementation, the first reference time may be a starting or an ending of a slot in which the terminal device sends the third indication information.

In an optional implementation, the first reference time may be a starting symbol or an ending symbol of a channel through which the terminal device sends the third indication information.

In an optional implementation, at least one of the first indication information, the second indication information, or the third indication information may be indicated through configured grant-uplink control information (CG-UCI).

It is to be understood by those skilled in the art that the relevant description of the device for sharing the COT in the embodiments of the disclosure can be understood with reference to the relevant description of the method for sharing the COT in the embodiments of the disclosure.

Figure 11:
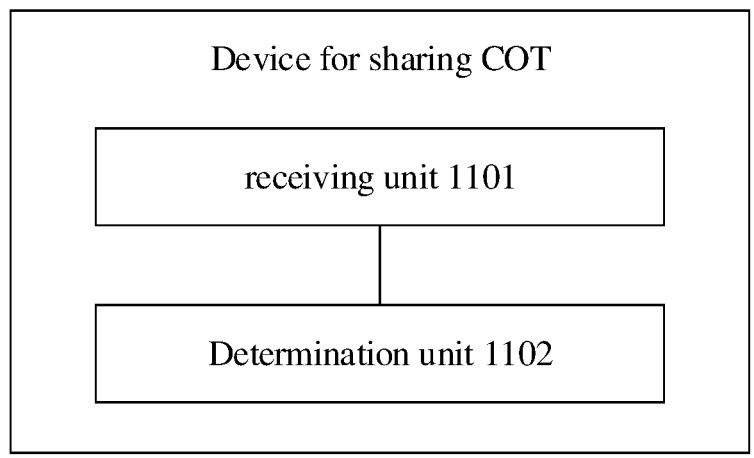
FIG. 11 is a second schematic diagram of a structure of a device for sharing COT according to at least some embodiments of the present disclosure.

FIG. 11 is a second schematic diagram of a structure of a device for sharing COT according to at least some embodiments of the present disclosure. Here, the device for sharing COT is applied to a network device. As illustrated in FIG. 11, the device for sharing COT includes a receiving unit 1101.

The receiving unit 1101 is configured to receive first indication information from a terminal device, the first indication information indicating whether a first COT initiated by the terminal device is allowed to be shared with the network device.

In an optional implementation, the first indication information may include 1-bit indication information. When a value of the 1-bit indication information is a first value, the first indication information indicates that the first COT is allowed to be shared with the network device. Or, when the value of the 1-bit indication information is a second value, the first indication information indicates that the first COT is not allowed to be shared with the network device.

In an optional implementation, one of the following may apply:

when the first indication information indicates that the first COT is allowed to be shared with the network device, the first COT is used for the network device to perform a downlink transmission; or when the first indication information indicates that the first COT is not allowed to be shared with the network device, when a first condition is verified, the first COT is used for the network device to perform the downlink transmission, the first condition being that an ending time of uplink transmission of the terminal device is before an ending time of the first COT.

In an optional implementation, the first indication information indicates that the first COT is allowed to be shared with the network device, and the first COT is used for the network device to perform a downlink transmission, the receiving unit may be further configured to receive second indication information from the terminal device, the second indication information indicating time domain resources in the first COT for the downlink transmission.

In an optional implementation, the second indication information may indicate at least one of the following: a starting time of the time domain resources; an ending time of the time domain resources; or duration of the time domain resources.

In an optional implementation, the second indication information may include at least one of the following: slot indication information; starting symbol indication information; or duration indication information.

The slot indication information indicates a number of slots between a first slot and a second slot, the first slot being a starting slot of the time domain resources and the second slot being a slot where the network device detects the second indication information.

The starting symbol indication information indicates a starting symbol of the time domain resources.

The duration indication information indicates a number of symbols or slots occupied by the time domain resources.

In an optional implementation, the number of slots indicated through the slot indication information may be one among a plurality of candidate slot numbers pre-stored or configured through radio resource control (RRC).

In an optional implementation, the starting symbol indication information may include N-bit bitmap indication information with each bit corresponding to a symbol position, N being a positive integer.

In an optional implementation, the number of symbols or slots indicated through the duration indication information may be one among a plurality of candidate symbol numbers or slot numbers pre-stored or configured through RRC.

In an optional implementation, the receiving unit 1101 may be further configured to receive third indication information from the terminal device, the third indication information being used for determining the first COT.

In an optional implementation, the third indication information may indicate at least one of the following: a starting time of the first COT; an ending time of the first COT; or duration of the first COT.

In an optional implementation, the third indication information may include at least one of the following: absolute duration indication information or symbolic duration indication information.

The absolute duration indication information indicates absolute time duration from a first reference time up to the ending time of the first COT.

The symbolic duration indication information indicates a number of symbols between the first reference time and the ending time of the first COT.

In an optional implementation, the first reference time may be determined based on a time when the terminal device sends the third indication information.

In an optional implementation, the first reference time may be a starting or an ending of a slot in which the terminal device sends the third indication information.

In an optional implementation, the first reference time may be a starting symbol or an ending symbol of a channel through which the terminal device sends the third indication information.

In an optional implementation, the device may further include a determination unit 1102. The determination unit 1102 may be configured to, when the first indication information indicates that the first COT is allowed to be shared with the network device, when a starting time of downlink transmission is before an ending time of the first COT and when an ending time of downlink transmission is before or at the ending time of the first COT, determine that actual allowed time domain resources for downlink transmission are the same as time domain resources indicated through the second indication information.

In an optional implementation, the device may further include a determination unit 1102. The determination unit 1102 may be configured to, when the first indication information indicates that the first COT is allowed to be shared with the network device, when a starting time of downlink transmission is before an ending time of the first COT and when an ending time of downlink transmission is after the ending time of the first COT, determine that actual allowed time domain resources for downlink transmission end before the ending time of the first COT.

In an optional implementation, the device may further include a determination unit 1102. The determination unit 1102 may be configured to, when the first indication information indicates that the first COT is not allowed to be shared with the network device, when an ending time of uplink transmission of the terminal device is before an ending time of the first COT, determine to share a portion of the first COT, a starting time of the portion of the first COT being after or at the ending time of the uplink transmission and an ending time of the portion of the first COT being before or at the ending time of the first COT.

In an optional implementation, one of the following may apply:

the ending time of the uplink transmission is indicated by the terminal device through fourth indication information;

the ending time of the uplink transmission is determined by the network device according to scheduling information of the uplink transmission; or the ending time of the uplink transmission is determined by the network device according to configuration information of the uplink transmission.

In an optional implementation, there is an association between an ending time of uplink transmission of the terminal device and a starting time of downlink transmission of the network device, the association being predefined or configured through RRC.

In an optional implementation, at least one of the first indication information, the second indication information, the third indication information, or the fourth indication information may be indicated through configured grant-uplink control information (CG-UCI).

It is to be understood by those skilled in the art that the relevant description of the device for sharing the COT in the embodiments of the disclosure can be understood with reference to the relevant description of the method for sharing the COT in the embodiments of the disclosure.

Figure 12:
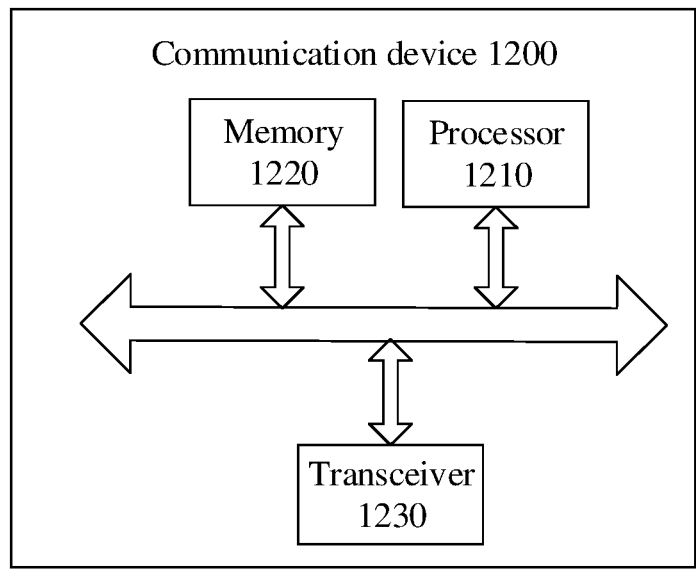
FIG. 12 is a schematic structural diagram of a communication device according to at least some embodiments of the present disclosure.

FIG. 12 is a schematic structural diagram of a communication device 1200 according to at least some embodiments of the present disclosure. The communication device can be a terminal device or a network device. The communication device 1200 illustrated in FIG. 12 includes processor 1210, and processor 1210 can call and run computer programs from memory to realize the method in the embodiments of the present disclosure.

Optionally, as illustrated in FIG. 12, the communication device 1200 may further include a memory 1220. The processor 1210 can invoke and run the computer program from memory 1220 to perform the method in the embodiments of the disclosure.

The memory 1220 may be a separate device independent of or integrated into the processor 1210.

Optionally, as illustrated in FIG. 12, the communication device 1200 may also include a transceiver 1230. The processor 1210 may control the transceiver 1230 to communicate with other devices, in particular, to send information or data to other devices, or receive information or data from other devices.

The transceiver 1230 may include a transmitter and a receiver. The transceiver 1230 may further include an antenna(s), the number of which may be one or more.

Optionally, the communication device 1200 can be specifically a network device of the embodiments of the present disclosure, and the communication device 1200 can realize the corresponding process realized by the network device in each method of the embodiments of the present disclosure. For the sake of simplicity, it will not be elaborated here.

Optionally, the communication device 1200 can be a mobile terminal/a terminal device according to the embodiments of the present disclosure, and the communication device 1200 can realize the corresponding flow realized by the mobile terminal/the terminal device in the various methods of the embodiments of the present disclosure. For the sake of brevity, it will not be described here.

Figure 13:
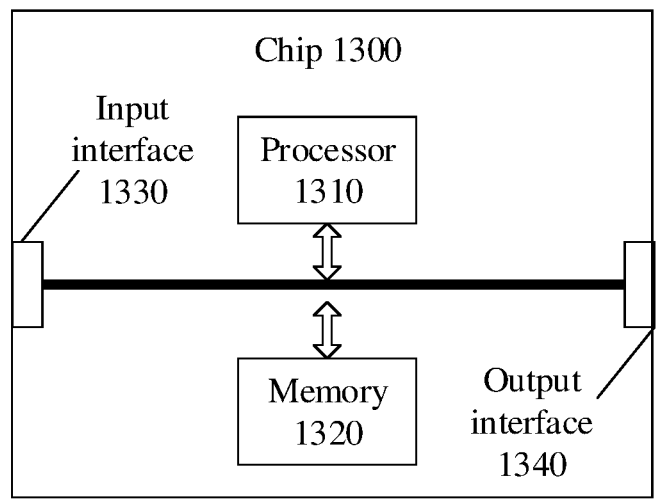
FIG. 13 is a schematic structural diagram of a chip according to at least some embodiments of the present disclosure.

FIG. 13 is a schematic structural diagram of a chip according to at least some embodiments of the present disclosure. The chip 1300 illustrated in FIG. 13 includes a processor 1310, and the processor 1310 can invoke and run computer programs from memory to perform the method in the embodiments of the disclosure.

Optionally, as illustrated in FIG. 13, the chip 1300 may also include a memory 1320. The processor 1310 can invoke and run the computer program from memory 1320 to perform the method in the embodiments of the disclosure.

The memory 1320 may be a separate device independent of or integrated into the processor 1310.

Optionally, the chip 1300 may also include an input interface 1330. The processor 1310 can control the input interface 1330 to communicate with other devices or chips, and in particular can obtain information or data sent by other devices or chips.

Optionally, the chip 1300 may also include an output interface 1340. The processor 1310 may control the output interface 1340 to communicate with other devices or chips, and in particular may output information or data to other devices or chips.

Optionally, the chip can be applied to the network device in the embodiments of the present disclosure, and the chip can realize the corresponding process realized by the network device in each method of the embodiments of the disclosure. For the sake of brevity, it will not be elaborated here.

Optionally, the chip can be applied to the mobile terminal/the terminal device in the embodiments of the present disclosure, and the chip can realize the corresponding flow realized by the mobile terminal/the terminal device in each method of the embodiment of the disclosure. For the sake of simplicity, it will not be described here.

It is to be understood that the chips mentioned in the embodiments of the present disclosure can also be referred to as system level chips, system chips, chip systems or on-chip system chips, etc.

Figure 14:
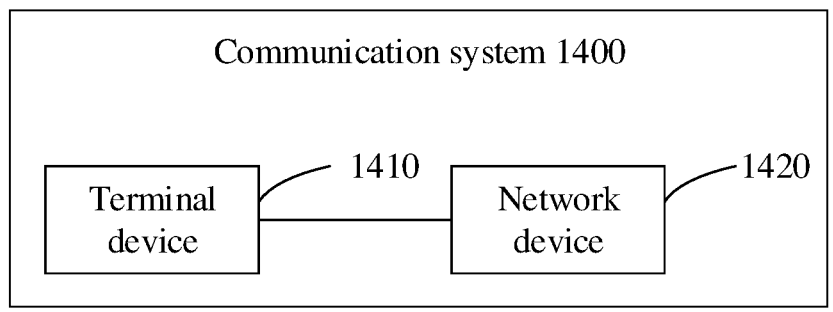
FIG. 14 is a schematic block diagram of a communication system according to at least some embodiments of the present disclosure.

FIG. 14 is a schematic block diagram of a communication system 1400 according to at least some embodiments of the present disclosure. As illustrated in FIG. 14, the communication system 1400 includes a terminal device 1410 and a network device 1420.

The terminal device 1410 can be used for realizing the corresponding functions realized by the terminal device in the above methods, and the network device 1420 can be used for realizing the corresponding functions realized by the network device in the above methods. For the sake of simplicity, it will not be elaborated here.

It is to be understood that the processor of the embodiments of the present disclosure may be an integrated circuit chip with signal processing capability. In the implementation process, each step of the above method embodiments can be completed by hardware integrated logic circuit in the processor and the software such as instructions the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or nonvolatile memory, or may include both volatile and nonvolatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM, enhanced SDRAM (esdram), synchlink DRAM (SLDRAM), and direct Rambus RAM (DR RAM). It is to be noted that the memory of the systems and methods described herein is intended to include, but is not limited to, these and any other suitable types of memory.

It is to be understood that the above described memory is exemplary but not restrictive. For example, the memory in the embodiment of the present disclosure can also be static RAM (SRAM), dynamic RAM (DRAM), synchronous dynamic random access memory (synchronous DRAM (SDRAM), double data rate SDRAM (DDR SDRAM), enhanced SDRAM (ESDRAM), synchronous link DRAM (SLDRAM), direct RAM (DR RAM), etc. That is to say, the memory in the embodiments of the present disclosure is intended to include, but not limited to, these and any other suitable types of memory.

The embodiments of the present disclosure also provide a computer-readable storage medium for storing computer programs.

Optionally, the computer-readable storage medium can be applied to the network device in the embodiments of the present disclosure, and the computer program enables the computer to execute the corresponding processes implemented by the network device in the various methods of the embodiments of the present disclosure. For the sake of brevity, it will not be repeated here.

Optionally, the computer-readable storage medium can be applied to the mobile terminal/the terminal device in the embodiments of the present disclosure, and the computer program enables the computer to execute the corresponding processes implemented by the mobile terminal/the terminal device in the various methods of the embodiments of the present disclosure. For the sake of brevity, it will not be repeated here.

The embodiment of the present disclosure also provides a computer program product, including computer program instructions.

Optionally, the computer program product can be applied to the network device in the embodiments of the present disclosure, and the computer program instructions enable the computer to execute the corresponding processes implemented by the network device in the various methods of the embodiments of the disclosure. For the sake of brevity, it will not be repeated here.

Optionally, the computer program product can be applied to the mobile terminal/the terminal device in the embodiments of the present disclosure, and the computer program instructions enable the computer to execute the corresponding process implemented by the mobile terminal/the terminal device in the various methods of the embodiments of the disclosure, for the sake of brevity, it will not be repeated here.

The embodiment of the present disclosure also provides a computer program.

Optionally, the computer program can be applied to the network device in the embodiments of the present disclosure. When the computer program runs on the computer, the computer executes the corresponding process realized by the network device in each method of the embodiments of the disclosure. For the sake of brevity, it will not be described here.

Optionally, the computer program can be applied to the mobile terminal/the terminal device in the embodiments of the present disclosure. When the computer program runs on the computer, the computer executes the corresponding process realized by the mobile terminal/the terminal device in the various methods of the embodiments of the disclosure. For the sake of brevity, it will not be elaborated here.

Those of ordinary skill in the art may realize that the unit and algorithm steps of each example described in combination with the disclosed embodiments herein can be realized by the combination of electronic hardware, or computer software and electronic hardware. Whether these functions are performed in hardware or software depends on the specific application and design constraints of the technical solution. A professional technician may use different methods to implement the described functions for each specific application, but such implementation shall not be considered beyond the scope of the present disclosure.

Those skilled in the art can clearly understand that for the convenience and simplicity of the description, the specific working process of the system, device and unit described above can refer to the corresponding process in the embodiment of the method described above, and will not be described here.

In several embodiments provided by the present disclosure, it should be understood that the disclosed systems, devices and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms.

The unit described as a separation part may or may not be physically separated, and the unit displayed as a unit may or may not be a physical unit, that is, it may be located in one place, or it may be distributed to multiple network units. Some or all of the units can be selected according to the actual needs to achieve the purpose of the embodiment.

In addition, each functional unit in each embodiment of the present disclosure may be integrated in one processing unit, each unit may exist physically alone, or two or more units may be integrated in one unit.

If the function is realized in the form of a software function unit and sold or used as an independent product, it can be stored in a computer readable storage medium. Based on such understanding, the technical solution of the present disclosure, in essence or in the form of a software product, which is stored in a storage medium, includes several instructions for making a computer device (which can be a personal computer, a server, a network device, etc.) perform all or part of the steps of the method according to each embodiment of the present disclosure. The aforementioned storage media includes: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

What is claimed is:

1. A method for sharing channel occupancy time (COT), comprising:

sending, by a terminal device, first indication information to a network device, wherein the first indication information indicates that a first COT initiated by the terminal device is allowed to be shared with the network device, and the first COT is used for the network device to perform a downlink transmission; and sending, by the terminal device, second indication information to the network device, wherein the second indication information indicates time domain resources in the first COT for the downlink transmission, wherein the second indication information comprises at least one of:

slot indication information for indicating a number of slots between a first slot and a second slot, the first slot being a starting slot of the time domain resources and the second slot being a slot where the terminal device sends the second indication information; or starting symbol indication information for indicating a starting symbol of the time domain resources.

2. The method of claim 1, wherein the first indication information comprises 1-bit indication information, and when a value of the 1-bit indication information is a first value, the first indication information indicates that the first COT is allowed to be shared with the network device.

3. The method of claim 2, wherein when the value of the 1-bit indication information is a second value, the first indication information indicates that the first COT is not allowed to be shared with the network device.

4. The method of claim 1, wherein the second indication information indicates at least one of the following:

a starting time of the time domain resources;

an ending time of the time domain resources; or duration of the time domain resources.

5. The method of claim 4, wherein the second indication information further comprises:

duration indication information for indicating a number of symbols or slots occupied by the time domain resources.

6. The method of claim 1, wherein the number of slots indicated through the slot indication information is one among a plurality of candidate slot numbers pre-stored or configured through radio resource control (RRC).

7. A method for sharing channel occupancy time (COT), comprising:

receiving, by a network device, first indication information from a terminal device, wherein the first indication information indicates that a first COT initiated by the terminal device is allowed to be shared with the network device, and the first COT is used for the network device to perform a downlink transmission; and receiving, by the network device, second indication information from the terminal device, wherein the second indication information indicates time domain resources in the first COT for the downlink transmission, wherein the second indication information comprises at least one of:

slot indication information for indicating a number of slots between a first slot and a second slot, the first slot being a starting slot of the time domain resources and the second slot being a slot where the terminal device sends the second indication information; or starting symbol indication information for indicating a starting symbol of the time domain resources.

8. The method of claim 7, wherein the first indication information comprises 1-bit indication information, and when a value of the 1-bit indication information is a first value, the first indication information indicates that the first COT is allowed to be shared with the network device.

9. The method of claim 8, wherein when the value of the 1-bit indication information is a second value, the first indication information indicates that the first COT is not allowed to be shared with the network device.

10. The method of claim 9, wherein the first value is 1 or 0.

11. The method of claim 9, wherein the second value is 0 or 1.

12. The method of claim 7, wherein at least one of the first indication information or second indication information is indicated through configured grant-uplink control information (CG-UCI).

13. A terminal device, comprising:

a transceiver;

a processor; and a memory for storing a computer program, wherein the processor is configured to call and run the computer program stored in the memory to cause the transceiver to:

send first indication information to a network device, wherein the first indication information indicates that a first COT initiated by the terminal device is allowed to be shared with the network device, and the first COT is used for the network device to perform a downlink transmission; and send second indication information to the network device, wherein the second indication information indicates time domain resources in the first COT for the downlink transmission, wherein the second indication information comprises at least one of:

slot indication information for indicating a number of slots between a first slot and a second slot, the first slot being a starting slot of the time domain resources and the second slot being a slot where the terminal device sends the second indication information; or starting symbol indication information for indicating a starting symbol of the time domain resources.

14. The terminal device of claim 13, wherein the first indication information comprises 1-bit indication information, and when a value of the 1-bit indication information is a first value.

15. The terminal device of claim 13, wherein the second indication information indicates at least one of the following:

a starting time of the time domain resources;

an ending time of the time domain resources; or duration of the time domain resources.

16. The terminal device of claim 15, wherein the second indication information further comprises:

duration indication information for indicating a number of symbols or slots occupied by the time domain resources.

17. The terminal device of claim 13, wherein the number of slots indicated through the slot indication information is one among a plurality of candidate slot numbers pre-stored or configured through radio resource control (RRC).

18. A network device, comprising:

a transceiver;

a processor; and a memory for storing a computer program, wherein the processor is configured to call and run the computer program stored in the memory to cause the transceiver to:

receive first indication information from a terminal device, wherein the first indication information indicates whether a first COT initiated by the terminal device is allowed to be shared with the network device, and the first COT is used for the network device to perform a downlink transmission; and receive second indication information from the terminal device, wherein the second indication information indicates time domain resources in the first COT for the downlink transmission, wherein the second indication information comprises at least one of:
- slot indication information for indicating a number of slots between a first slot and a second slot, the first slot being a starting slot of the time domain resources and the second slot being a slot where the terminal device sends the second indication information; or
- starting symbol indication information for indicating a starting symbol of the time domain resources.

19. The network device of claim 18, wherein the first indication information comprises 1-bit indication information, and when a value of the 1-bit indication information is a first value, the first indication information indicates that the first COT is allowed to be shared with the network device.

20. The network device of claim 19, wherein when the value of the 1-bit indication information is a second value, the first indication information indicates that the first COT is not allowed to be shared with the network device.

21. The network device of claim 20, wherein the first value is 1 or 0.

22. The network device of claim 20, wherein the second value is 0 or 1.

23. The network device of claim 18, wherein at least one of the first indication information or second indication information is indicated through configured grant-uplink control information (CG-UCI).

* * * * *